Patented May 9, 1933

1,907,634

UNITED STATES PATENT OFFICE

WILLIAM B. WESCOTT, OF BOSTON, MASSACHUSETTS, ASSIGNOR TO DEWEY AND ALMY CHEMICAL COMPANY, OF CAMBRIDGE, MASSACHUSETTS, A CORPORATION OF MASSACHUSETTS

TREATMENT OF ASBESTOS WITH LATEX AND PRODUCT THEREOF

No Drawing.    Application filed June 10, 1930.  Serial No. 460,305.

This invention relates to treatment of asbestos fiber with an aqueous dispersion of rubber, such as natural latex, and to the product thereof.

The process is broadly characterized by dispersing asbestos fiber in rubber latex in the presence of a colloid which is effective to serve as a protective against coagulation,— and sometimes but not always in the presence of an additional dispersing agent and/or an additional potential coagulant,—and thereafter nullifying the anti-coagulant effect of the protective, preferably by the application of heat, whereby latex rubber is flocculated or distributively coagulated about or among the individual asbestos fibers.

The term latex as herein used is to be taken to include artificial dispersions of rubber as well as natural latices.

It is well known that all natural asbestos has a coagulating influence on aqueous dispersions of rubber and on latex, the dispersion or latex being alkaline. Certain colloid protectives have been suggested as effective means of preventing coagulation of latex when asbestos fiber is saturated therewith and three methods have been proposed for such treatment of asbestos with latex.

The first and most obvious consisted in adding a suitable protective to latex, saturating the asbestos fiber therewith and then removing the watery constituents of the latex by desiccation whereby an uncoagulated or gel rubber was produced in situ throughout the fiber mass. This process is open to the serious objection that the drying is slow and tedious and the uniformity of distribution of rubber throughout the mass is impossible of attainment by reason of the tendency of the rubber particles to diffuse outwardly with the watery component.

The second method consisted in dispersing asbestos fiber to form a slurry in a very dilute latex protected against coagulation by the asbestos and subsequently adding other coagulants in amounts sufficient to overcome the protective and thereafter assembling the fiber on the screen of a paper making machine. This process is objectionable because of the large amount of water required, the inevitable loss of coagulated though minute particles of rubber, and perhaps more important than all, the fact that the individual coagula of rubber are not distributed among or with relation to the fibers with uniformity. Furthermore, the use of paper making machinery or its equivalent is necessitated by reason of the great dilution.

The third method involves a preliminary acid treatment of the fiber by which its coagulation producing component is removed. For many purposes however this method is open to the serious objection that the fiber suffers a considerable loss of strength due to the treatment.

The present invention has for its major object the avoidance of the objectionable features of the processes above mentioned. Another object of the invention is to produce an asbestos fiber carrying substantially uniformly distributed minute coagula of rubber. Another object of the invention is to produce a more uniform dispersion of asbestos fiber than is obtainable in water whereby there is a substantial increase in the fiber surface accessible to the latex. A still further object of the invention is to distribute the rubber latex among the fibers as stated in the presence of a protective which will prevent the fibers from becoming coherently united until dried and subjected to heat and/or pressure.

Another object of the invention is to obtain a slurry of asbestos fibers and rubber the watery component of which may be removed in any convenient manner.

It has been discovered as a part of the invention that colloid protectives added to latex, in just sufficient quantity to stabilize said latex at or about room temperature against the coagulative influence of asbestos fiber dispersed therein or that of any other coagulant which may have been added thereto, cease to prevent coagulation when the temperature is raised to a value approximating the boiling point. It is also discovered that the uniformity of distribution of the rubber coagula and the fibers depends in part upon the uniformity of the dispersion of these fibers in the latex and that certain colloid protectives disperse the fibers as well as protect the latex against coagulation while dispersion is being brought about; and further, that such fibers treated with latex and suitable colloid protectives do not, upon coagulation of the latex, tend to cohere so that when the thus treated fibers are dried, even though dried in fairly compact masses, they may be again redispersed in a watery medium. Among the colloid protectives found suitable for the purpose may be mentioned sulphonated oil soaps such as sulphonated castor oil soap or Turkey red oil for instance, sodium silicate, casein and hemoglobin, serum albumen or egg albumen. Any protective which is either so modifiable by heat or otherwise as to suffer a loss of its protective efficacy, such as the coagulable proteids, or is capable of protecting the latex at room temperature but suffers a loss of its protective efficiency at other temperatures, e. g., approximating the boiling point, such as those above mentioned as well as soaps, saponins and the like, may be satisfactorily used. In general it will be found that the protective having the greatest dispersing value will give the best results so far as uniformity of distribution of rubber is concerned. Sometimes where commercial operations preclude nice control it is advantageous to avoid protectives which have to be used in precisely limited amounts and I then prefer to avail myself of the coagulable protectives, of which hemoglobin is an example, and sometimes but not always find it desirable to supplement the dispersing effect of the protective by means of highly effective dispersing agents, such as Turkey red oil, above mentioned, caustic soda, sodium salts of the condensation product of beta naphthaline sulphonic acid and formaldehyde, or the like. In general, the more finely divided the fiber the greater the need and utility of a dispersing agent.

Substantially all common compounding ingredients, such as sulphur, zinc oxide, litharge, graphite, finely comminuted metallic lead and the like, may be added to the slurry and dispersed therein. It is obvious, however, that if any of the added ingredients be of itself a coagulant its coagulative influence must be counterbalanced by the addition of a greater amount of protective than would be required to offset the coagulative influence of the asbestos fiber alone. It will be found that vulcanizing agents, pigments, et cetera are distributed with the rubber about the fiber with a surprising uniformity.

The following examples will serve to show how the invention may be practiced.

*Example I*

Prepare three aqueous dispersions, as follows:

1. Dissolve 15 grams hemoglobin in 12 liters of water, in an agitating tank, then add 1000 grams short asbestos fiber (screened pulp made from serpentine rock will serve), Agitate for fifteen to twenty minutes, to ensure thorough wetting and dispersion of the fibrous material.

2. To 200–300 grams of water containing 10 grams dissolved hemoglobin, add a pigment-slurry, previously prepared by grinding in a paint mill, containing:

| | Grams |
|---|---|
| Finely divided sulphur | 75 |
| Finely divided zinc oxide | 75 |
| Finely divided litharge | 165 |
| Finely divided graphite | 36 |

Accelerators may be added as desired.

3. Dilute 500 grams rubber latex containing 150 grams rubber, with 1000 grams water containing 5 grams dissolved hemoglobin.

Add the pigment-slurry (2) to the fiber mixture (1), with agitation maintained long enough to effect thorough and uniform distribution of the dispersed particles. Then run the diluted and protected latex (3) into the mixture composed of (1) and (2), continuing the agitation. When the latex is uniformly mixed with the other ingredients, admit dry steam directly into the agitated mix, preferably at a rate such that the whole mix rises uniformly in temperature and attains a uniform temperature approximating 100° C. in preferably not less than thirty minutes. When the liquid reaches a temperature slightly above the coagulation point of the hemoglobin, there occurs a visible clarification which indicates that the dispersed rubber is being coagulated.

It is desirable that the temperature of the mass be raised gradually and uniformly. For this reason agitation is continued during the heating, and the heating is effected gradually; in general it is desirable to carry the heating to a temperature approximating the boiling point. In the instant example the liquid will be quite clear in approximately thirty minutes. The fiber-slurry may then be treated in any convenient manner for the removal of the major portion of the water. Thus it may be sheeted on a wet machine, concentrated in a centrifuge or collected on a filter screen and subsequently dried out at a temperature which should not exceed 150° F. Drying may be accomplished at a reduced pressure, as in a vacuum drier or in any convenient hot-air oven. If drying be effected without excessive heat or pressure, the particle-mass retains its discrete constitution and can be redispersed in water.

*Example II*

Follow the instructions under Example I, substituting either casein, sodium silicate, or Turkey red oil for hemoglobin, using however the same proportions of protective as prescribed for hemoglobin. In this example, however, the protective material is not itself modified by heat as is the hemoglobin used in Example I, but its protection is apparently overcome by the superior coagulating power acquired by the asbestos and the zinc oxide at the higher temperature.

As the protective is unmodified, most of it is removed when the water is withdrawn from the slurry preparatory to drying. Some, however, remains and this remaining protective would seem to account for the fact that the fibers may be again redispersed in water, even after drying, by means of a beating engine or similar agitating device.

No theory is advanced to explain the similar secondary protective role played by the coagulated protein in Example I, but the observation of fact may be made that the rubber does not, as would be expected, weld the fibers into a unitary mass during coagulation and drying, but may on the contrary be readily redispersed in water.

It is to be observed that, where a non-heat nullifiable protective is used, a rather careful adjustment of the quantity of protective is necessary. If more than is approximately just requisite to the protection of the latex against coagulation by the coagulative influences present at room temperature is used then these coagulative influences, even though increased by the higher temperature, may be insufficient to clarify the too-well protected rubber dispersion. If on the other hand too little protective is used, the latex tends to coagulate in a lumpy uneven deposit which under the microscope appears similar to the deposit obtained where acid is added to a dilute latex-fiber suspension, as heretofore suggested. It is therefore sometimes desirable to use a combination of a heat nullifiable protective and a non-heat nullifiable protective as in the following example.

*Example III*

Proportions of latex, water and fillers may be chosen, as in Example I, with 15 grams of Turkey red oil instead of hemoglobin, added to the water used to disperse the fiber. The pigment-slurry and the diluted latex are prepared as in Example I, and the further treatment carried out as therein described.

The ratio of rubber to asbestos may be varied over a very wide range. The minimum amount of rubber is deposited in substantially uniform distribution among well-opened up serpentine asbestos and will under heat and pressure yield a non-porous mass, i. e., one in which all the fiber interstices are satisfied with rubber, and which contains approximately 8% rubber taken on the weight of the fiber.

The attainable upper limit, if any, has not been determined, but for the conditions given in the foregoing examples it may be of the order of 25%-rubber. By increasing the temperature or the coagulative influences or by extending the coagulation period, rubber at least in an amount equal to the weight of the fiber may be employed. This is surprising when it is remembered that the coagulative influence is mainly due to the fiber itself. It is thought that the rubber deposit has the well-known reticulate permeable structure of a rubber coagulum and that coagulation from the fiber outwards may proceed indefinitely; albeit more slowly as the coagulated rubber increases in thickness. The presence of zinc oxide, included in the foregoing examples, probably accounts for some of the coagulative effect. The uniformity of distribution, as stated, depends in a large measure upon the dispersion of the fiber.

As is apparent from the examples given, a relatively large amount of water is used, so that the individual fibers may be well spaced apart. In this process, however, the disadvantage of great dilution, as above mentioned, does not hold because here the individual discrete particles of dispersed rubber, i. e., the rubber globules, become coagulatively associated with the fiber, and substantially surround the same, whereas in the heretofore suggested process above mentioned, coagulation by means of added acid produces unassociated, independent agglomerates of rubber; i. e., small clots or minute rubber coagula, some of which become entangled or entrained by the fiber when the water is removed on the screen of a paper machine or a like device, while others are lost with this water.

When the maximum uniformity of fiber distribution and "felting" is desired and/or when heavy fillers such as finely comminuted metallic lead is desired in uniform distribution there is sometimes advantage in obtaining a single shaped mass of intermingled or "felted" fiber and rubber directly from a dispersion thereof prepared as above except as to dilution, for which purpose the fiber is preferably dispersed with the aid of a trace of caustic soda instead of the hemoglobin, as in Example I; the hemoglobin used in the pigment slurry may also be omitted, and after this slurry has been thoroughly mixed with the dispersed fiber, the major portion of the watery component is removed in any convenient manner, such as by means of a centrifuge, screen box filter or the like. Where the fiber and pigment mass has been concentrated to about nine parts of water to one part solid, the latex of Example I, to which the stated 5 grams of hemoglobin have been added, but without the 1000 grams of water there called for, is then stirred into the fiber and pigment-slurry together with any very heavy pigments if these are to be used. In these proportions the mass should then be of a thick, though fluid consistency and may be poured into a shaping or forming receptacle. Instead of applying heat interiorly of the latex-fiber pigment mass, the receptacle with its slurry content should be exteriorly heated. This may be accomplished in any convenient manner. Coagulation takes place progressively throughout the mass, as the temperature rises above the coagulation point of the hemoglobin. The rubber is coagulated as before but presumably because of the change in surface conditions the mass loses some of its mobility and exhibits a tendency to cohere. This coherence is thought to be due to the "felting" of the fibers rather than coalescence of the rubber. The clear watery component may to a great extent be removed by pressure and the residual moisture subsequently removed by desiccation, or the shaped mass may be dried as formed, without preliminary pressing.

The fiber treated according to this invention may be assembled, while wet, in any usual and convenient manner either in the form of sheets by means of filtering devices, centrifugal screens, or the usual paper or board machines.

Sheet material may be made from the dilute fiber suspension, after coagulation of the rubber, on the usual so-called wet machine. The so formed sheet may be flattened by rolling or otherwise with further reduction of its water content and it may then be cut into sections indicated by the size and shape of the desired end product. The resulting scrap may be reused directly or may be worked up as part of a new batch.

As an alternative method of use of the treated fiber of this invention, the major portion of the water may be removed in any convenient manner and the damp fiber mass may be opened up by any suitable mechanism, such as a card waste cleaner for example and thereafter dried in an open more or less fluffy free state. Dried masses of fiber may also similarly be opened up albeit with some loss of fiber length particularly if they have been subjected to compacting pressure. Because of the noncoherent state of the treated fibers of this invention the opening up operation does not appreciably disturb the distribution of rubber therewith. This is of advantage.

Where rubber treated asbestos fibers are coherently united by the rubber and are then subjected to such an opening process and subsequently molded and vulcanized under heat and pressure the product has a lower tensile strength than that exhibited by a product as initially made of fresh fibers by this invention when all other conditions are substantially the same. This is believed to be due to the fact that in opening up the fibers coherently united by rubber the separation occurs not in the rubber but by a longitudinal splitting of the fibers thus producing a comminution consisting for the main part of raw fibers held exteriorly of the rubber.

While the process of this invention is particularly applicable to the treatment of asbestos fiber of whatever species it is also applicable to the treatment of other fibers inherently coagulable of latex or so treated as to be rendered coagulable of latex. Thus any fiber which has, however faintly, an acid reaction may be held, for the purpose of this invention, to be coagulative of latex and such a condition obtains in fibers treated by certain textile so-called mordanting processes. It is also found that fibers which have been contacted with rubber, as for instance the rubber frictioned cords of automobile tire fabric are coagulative of latex. It is further found that any finely divided material which is in itself coagulative of latex and is capable of adsorption by vegetable fibers renders said fibers, when adsorbed on the surface thereof, coagulative of latex. Carbon and gas blacks as well as zinc oxide when of colloidal dimensions are examples of such finely divided materials.

Fibers normally noncoagulative of latex and so treated as to become coagulative of latex may be substituted for the asbestos fiber in the foregoing examples.

I claim:

1. Method of coagulating rubber upon asbestos fiber, characterized by preparation of a dispersion in the aqueous vehicle of a rubber latex, of asbestos fibers and a protective at a temperature whereat the protective is effective, then raising the temperature of the mix to the point at which the protective ceases to be effective against the asbestos, thereby producing rubber coagula uniformly distributed about and among the asbestos fibers.

2. Method of coagulating rubber upon asbestos fiber, characterized by preparation of a dispersion in the aqueous vehicle of a rubber latex, of asbestos fibers and a heat-coagulable protective, at a temperature lower than that of its coagulation, then raising the temperature of the mix to the point of protective-coagulation, thereby producing rubber coagula uniformly distributed about and among the asbestos fibers.

3. Composition of matter, comprising a mass of discrete asbestos fibers individually surrounded by rubber coagula and capable of dispersion in water.

4. Composition of matter, comprising a mass of discrete asbestos fibers individually surrounded by rubber coagula, capable of dispersion in water, and when dry capable of concretion under heat and pressure.

5. Method of coagulating rubber upon asbestos fiber, characterized by preparation of a dispersion in the aqueous vehicle of a rubber latex, of asbestos fibers in mutually separated relation and a protective at a temperature whereat the protective is effective, then raising the temperature of the mix to the point at which the protective ceases to be effective against the asbestos, thereby producing rubber coagula uniformly distributed about and among the asbestos fibers individually.

6. Method of coagulating rubber upon asbestos fiber, characterized by preparation of a dispersion in the aqueous vehicle of a rubber-latex, of asbestos fibers in mutually separated relation and a heat-coagulable protective, at a temperature lower than that of its coagulation, then raising the temperature of the mix to the point of protective-coagulation, thereby producing rubber coagula uniformly distributed about and among the asbestos fibers individually.

7. Composition of matter, comprising a dry mass of discrete asbestos fibers individually surrounded by rubber coagula, and capable of dispersion in water.

Signed by me at Cambridge, Massachusetts, this sixth day of June 1930.

WILLIAM B. WESCOTT.